United States Patent
Greenwood et al.

(10) Patent No.: US 6,188,183 B1
(45) Date of Patent: Feb. 13, 2001

(54) HIGH INTENSITY DISCHARGE LAMP BALLAST

(76) Inventors: Simon Richard Greenwood, Brookdale Cottage, Chelford Road, Henbury Macclesfield, Cheshire, SK10 3LH (GB); Stephen Soar, 19 Wroxham Close, Bury, Lancashire, BL8 1EN (GB)

(*) Notice: Under 35 U.S.C. 154(b), the term of this patent shall be extended for 0 days.

(21) Appl. No.: 09/330,558

(22) Filed: Jun. 11, 1999

(30) Foreign Application Priority Data

Jun. 13, 1998 (GB) .................................................. 9812703
Mar. 3, 1999 (GB) .................................................. 9904913

(51) Int. Cl.[7] ...................................................... G05F 1/00
(52) U.S. Cl. ...................... 315/307; 315/224; 315/291; 315/DIG. 2; 315/DIG. 7
(58) Field of Search .......................... 315/290 R, 200 R, 315/224, 225, 276, 291, 307, 283, 289, DIG. 2, DIG. 5, DIG. 7

(56) References Cited

U.S. PATENT DOCUMENTS

| | | | |
|---|---|---|---|
| 3,710,177 | 1/1973 | Ward | 315/106 |
| 4,053,813 | 10/1977 | Kornrumpf et al. | 315/206 |
| 4,060,752 | 11/1977 | Walker | 315/244 |
| 4,186,437 | 1/1980 | Cuk | 363/65 |
| 4,498,031 | 2/1985 | Stupp et al. | 315/307 |
| 4,538,093 | 8/1985 | Melai | 315/219 |
| 4,594,531 | 6/1986 | Ganser et al. | 315/307 |
| 4,717,863 | 1/1988 | Zeiler | 315/307 |
| 4,719,390 | 1/1988 | Sairanen | 315/246 |
| 4,723,098 | 2/1988 | Grubbs | 315/306 |
| 4,873,471 | 10/1989 | Dean et al. | 315/308 |
| 4,893,063 | 1/1990 | Pernyeszi | 315/307 |
| 4,935,669 | 6/1990 | Nilssen | 315/105 |
| 4,952,849 | 8/1990 | Fellows et al. | 315/307 |
| 5,021,714 | 6/1991 | Swanson et al. | 315/101 |
| 5,049,790 | 9/1991 | Herfurth et al. | 315/291 |
| 5,111,118 | 5/1992 | Fellows et al. | 315/307 |
| 5,198,728 | 3/1993 | Bernitz et al. | 315/307 |
| 5,371,440 | * 12/1994 | Liu et al. | 315/307 |

(List continued on next page.)

FOREIGN PATENT DOCUMENTS

| | | | |
|---|---|---|---|
| 0 091 724 A1 | 10/1983 | (EP) | H05B/41/29 |
| 0 271 396 A1 | 6/1988 | (EP) | H05B/41/29 |
| 0 279 489 A1 | 8/1988 | (EP) | H05B/41/22 |
| 0 408 121 A2 | 1/1991 | (EP) | H05B/41/29 |
| 2319 677 | 5/1998 | (GB) | H05B/41/29 |

OTHER PUBLICATIONS

Eugene Hnatek, *Design of Solid–State Power Supplies*, Third Edition, 1989, Van Nostrand, pp. 64–67 and 350–351.

Cuk & Erickson, "A Conceptually New High–Frequency Switched–Mode Power Amplifier Technique Eliminates Current Ripple," Proceedings of PowerCon® 5 conference, May 4–6 1978; pp. 401, 403 and 419.

Texas Instruments description of their TPS5210 integrated circuit; Sep. 1998—revised May 1999.

*Primary Examiner*—Don Wong
*Assistant Examiner*—Thuy Vinh Tran
(74) *Attorney, Agent, or Firm*—Craig A. Summerfield, Esq.; Brinks Hofer Gilson & Lione

(57) ABSTRACT

A means of ballasting for high intensity discharge (HID) lamps, wherein the necessary lamp striking voltage, warm-up current and steady state running current may all be controlled using only two power switching transistors 9,10 operating in two discrete modes. A further feature provides a means of lamp power control over a range of lamp voltages such that the lamp power input remains substantially constant throughout the ageing of the lamp 19. The use of this means of ballasting HID lamps can offer major cost benefits, lower circuit complexity, longer lamp life and colour maintenance and increased flexibility of the wiring installation and lamp position relative to the ballasting and striking means.

38 Claims, 7 Drawing Sheets

U.S. PATENT DOCUMENTS

| | | | |
|---|---|---|---|
| 5,381,076 | 1/1995 | Nerone | 315/209 R |
| 5,406,177 | 4/1995 | Nerone | 315/307 |
| 5,422,545 | 6/1995 | Felper et al. | 315/209 R |
| 5,491,386 | 2/1996 | Eriguchi et al. | 315/209 R |
| 5,563,477 | 10/1996 | Ribarich et al. | 315/307 |
| 5,574,338 | 11/1996 | Kuusisto et al. | 315/307 |
| 5,589,742 | 12/1996 | Ueda | 315/307 |
| 5,623,188 | 4/1997 | Bildgen | 315/307 |
| 5,680,015 * | 10/1997 | Bernitz et al. | 315/291 |
| 5,717,295 | 2/1998 | Nerone | 315/307 |
| 5,719,472 | 2/1998 | Kachmarik et al. | 315/224 |
| 5,723,953 | 3/1998 | Nerone et al. | 315/307 |
| 5,801,491 * | 9/1998 | Canova | 315/224 |
| 5,838,117 | 11/1998 | Nerone | 315/307 |
| 5,844,380 | 12/1998 | Siepkes | 315/347 |

* cited by examiner

FIG. 3 LAMP CURRENT

HIGH INTENSITY DISCHARGE LAMP BALLAST

This application claims foreign priority under 35 U.S.C. §119(a)–(d) or 356(b) of Great Britain Applications Nos. 9812703.8 (pending) and 9904913.2 (pending), filed Jun. 13, 1998 and Mar. 3, 1999, respectively.

DESCRIPTION

1. Technical Field

This invention relates to a power control circuit which is particularly, though not exclusively, suited to the ballasting of low and high pressure sodium, mercury arc and metal halide discharge lamps (high intensity discharge lamps or HID lamps). Typically such systems can be used for highway lighting, architectural floodlighting, warehouse and industrial lighting etc.

2. Background of the Invention

Traditionally, ballasting for HID lamps is by use of inductors or chokes capable of controlling the lamp current through the impedance they present in series with the mains supply voltage. With some types of HID lamp a high striking voltage, typically 4–5 kV, is required to ionize the gas filling the tube and initiate the arc.

In prior art systems for ballasting HID lamps, the lamp ballasting means and the lamp striking means are typically discrete circuit elements. Historically, HID lamps have been ballasted by using the impedance of a series connected inductor for controlling the lamp current and a separate starter or igniter module to provide the necessary high voltage to strike the lamp.

FIG. 1 illustrates a typical arrangement for prior art electronic ballasts for HID lamps. A conventional power factor controller is formed by transistor TR1, inductor L1, diode D1 and capacitor C1. Alternating positive and negative output voltage is provided to the lamp by a full bridge arrangement comprising four transistors TR3, TR4, TR5, TR6. The transistors are alternately switched on and off in complementary pairs TR3, TR6 and TR4, TR5 at a low frequency, typically 100–200 Hz.

Connected in series with the lamp across the bridge is an igniter circuit comprising pulse transformer TX1, a Sidac, capacitor C3 and resistor R1. When the igniter circuit operates, the capacitor C3 charges through resistor R1 to a voltage at which the Sidac device switches on, discharging the capacitor C3 into the primary winding of the transformer TX1. The voltage applied to the transformer primary is multiplied by the high turns ratio of the transformer and is sufficient to ionize the gas filling the lamps arc tube, thereby initiating an arc.

Since the voltage is AC, the arc will be extinguished when the lamp current approaches zero and the voltage applied to the tube is subsequently reversed. Therefore the igniter must operate again in the opposite voltage half cycle to re-strike the arc for the flow of current in the opposite direction. This ignition cycle is repeated until the lamp electrodes are sufficiently heated by the arc current for thermionic emission to take place. Then the arc voltage in the tube falls below the threshold voltage of the Sidac and arc current is maintained without operation of the igniter circuit.

A further transistor TR2 controls the flow of current in the output bridge circuit and consequently controls the lamp current. Transistor TR2 is turned on until the current in inductor L2 reaches a preset threshold value, then the transistor TR2 is turned off. Current continues to flow via a diode D2 until the current has decayed to another preset threshold value, then the transistor TR2 is turned on again.

Because of the high rate of rise of voltage, the capacitance and inductance of the wiring to the lamp act to attenuate the high voltage ignition pulse to the lamp, so limiting the practical length of the wiring between the igniter circuit and the lamp.

In recent years it has become known to use high frequency (>20 kHz) electronic ballasts to supply lamp current for fluorescent lamp installations, giving longer tube life due to lower tube current crest factor and higher overall efficiencies due to reduced power losses in the ballast and tube. Attempts have been made to design high frequency electronic ballasts for HID lamps with some level of success but these are fraught with problems due mainly to the predisposition of many HID lamps to acoustic arc resonance when operated at frequencies substantially above line frequency. It is in some cases possible to design high frequency ballasts specifically for one type and size of HID tube if the operating frequency of the ballast is chosen carefully but if the gas pressure in the tube changes substantially during the life of the tube the resonance characteristics will also change and could cause catastrophic failure of the arc tube. This will be at best alarming and could be dangerous if the arc tube fragments are not sufficiently contained within the lamp fitting (luminaire).

SUMMARY OF THE INVENTION

The invention provides a high intensity discharge lamp ballast circuit comprising: a high intensity discharge lamp connected between a first lamp terminal and a second lamp terminal; a resonant circuit, to which the first lamp terminal is connected; first switching means operable to connect the resonant circuit to a positive rail of a source of high voltage; second switching means operable to connect the resonant circuit to a negative rail of the source of high voltage; control means for alternately operating the first and second switching means to supply current to the resonant circuit, the alternation occurring in a first mode at a first switching frequency that causes the resonant circuit to resonate and in a second mode at a second switching frequency that does not cause the resonant circuit to resonate; and current limiting means for limiting the electrical current through the lamp.

By operating in two modes, respectively at high and low frequency, the invention overcomes many of the problems associated with prior art HID lamp ballasts. The first, high frequency mode is operated at typically greater than 20 kHz while the lamp is cold and uses resonance to cause the lamp to strike. Once the lamp has warmed up sufficiently for thermionic emission from the lamp electrodes, the second mode of operation may be employed at typically less than 1 kHz and the lamp arc will be maintained. Because resonance in the first mode of operation is used to provide sufficient voltage to strike the lamp, there is no requirement for a separate igniter circuit and consequently the expense of components such as the Sidac can be avoided.

Preferably, a first return capacitor is connected between the second lamp terminal and the positive high voltage rail and a second return capacitor is connected between the second lamp terminal and the negative high voltage rail. Because the lamp voltage is boosted by resonance in the first mode of operation and because a comparatively low lamp voltage is required to maintain the arc in the second mode of operation, it is possible to run the lamp according to the invention using only half the voltage from the split high voltage supply. Thus a full transistor bridge circuit is not necessary and return capacitors may replace two of the transistors, with consequent cost savings.

In a preferred embodiment of the invention, the current limiting means comprises sensing means for measuring the current through the lamp; means for representing the measured current as a voltage signal; means for comparing the voltage signal with a reference voltage; and means for disabling the operation of the first and second switching means by the control means if the compared voltage signal is greater than the reference voltage. By effecting current limiting through disabling operation of the first and second switching means, the need for a separate current control transistor (such as transistor TR2 in FIG. 1) is avoided.

Thus, the present invention makes possible control of the necessary lamp striking voltage, the warm-up current and the steady state running current using only two power switching transistors operating in two discrete modes, which represents a significant saving of components compared with the prior art.

A further preferred feature of the present invention provides a lamp power control means, comprising: a power factor controller for receiving input from an external power source and for supplying a stable voltage to the positive and negative high voltage rails; means for sensing the value of the current flowing in the high and low voltage rails; and means for changing the reference voltage of the current limiting means in response to deviations from a set value of the current flowing in the high and low voltage rails, so as to maintain constant lamp power. Shutdown means may also be provided for turning off current to the lamp if the reference voltage of the current limiting means passes a predetermined threshold.

In addition, the invention provides a method of powering a lamp via a lamp ballast circuit as previously defined, the method comprising the steps of: in the first mode operating the first and second switching means alternately at the first frequency, thereby causing the resonant circuit to resonate and generating sufficient voltage between the first and second lamp terminals to cause the lamp to strike; and subsequently in the second mode operating the first and second switching means alternately at the second frequency, whereby the resonant circuit does not resonate but the lamp continues to conduct, the second frequency being lower than the first frequency. Preferably, the change in operation from the first mode to the second mode occurs after a predetermined time, chosen to allow the lamp to warm up sufficiently for the thermionic emission from the lamp electrodes.

THE DRAWINGS

FIG. 3 illustrates schematically a typical lamp current waveform in accordance with the invention.

DESCRIPTION OF PREFERRED EMBODIMENTS

Figure 1:
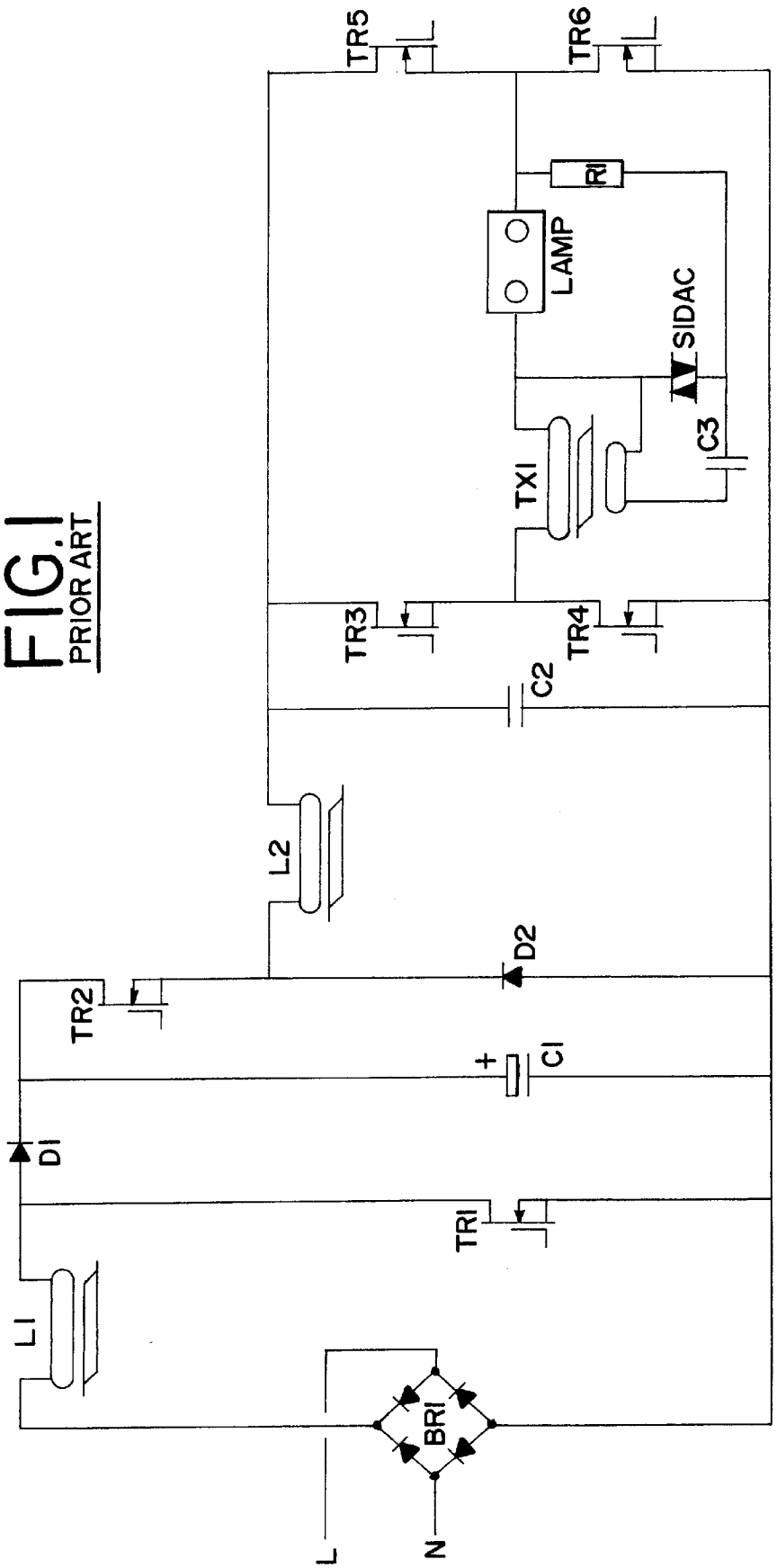
FIG. 1 illustrates a lamp ballast circuit according to the prior art.
Figure 2:
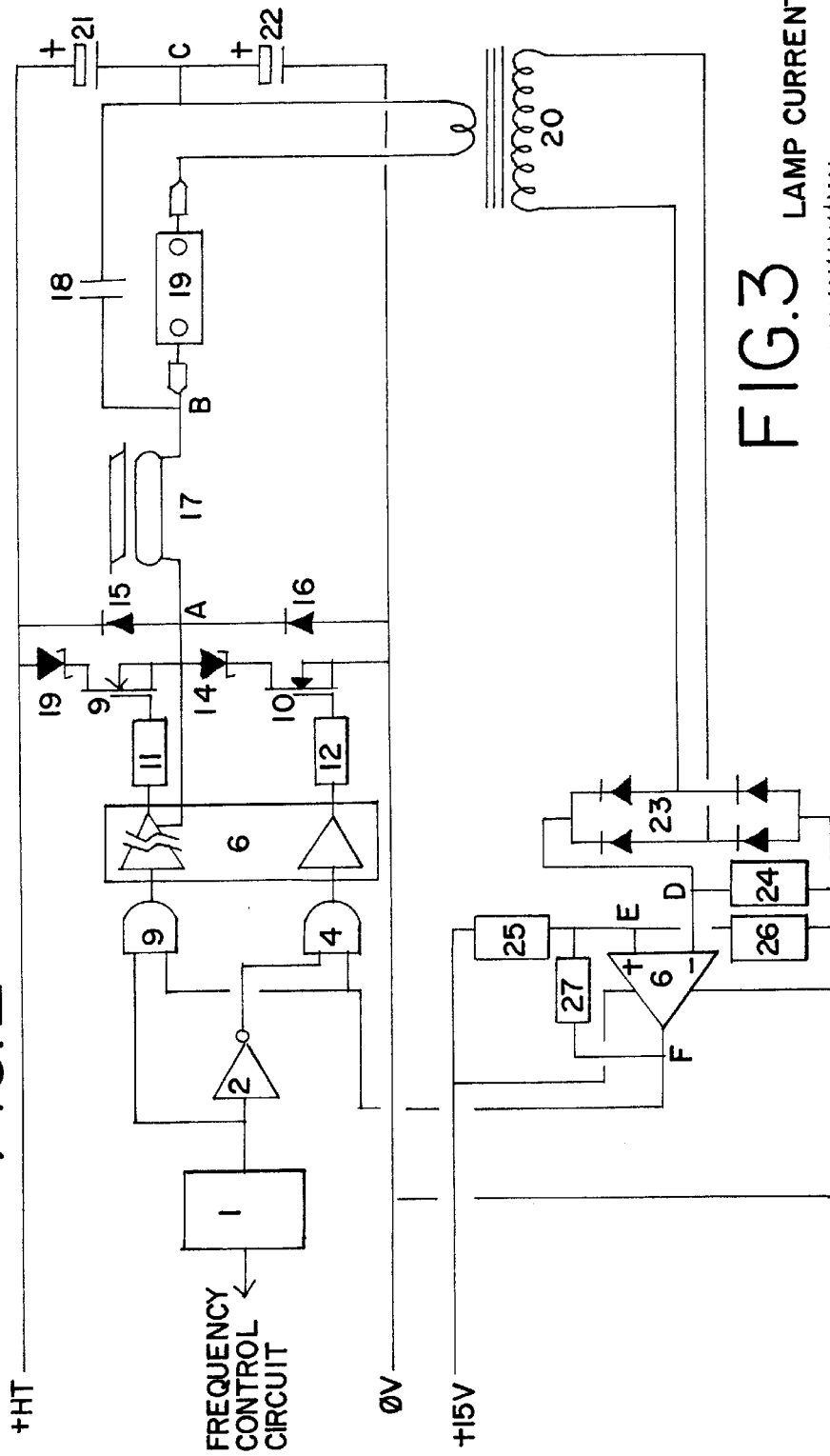
FIG. 2 illustrates a lamp ballast circuit according to a first preferred embodiment of the invention.

FIG. 2 shows a first embodiment of the invention in which the operation of the circuit is characterised by two discrete modes.

A frequency control circuit (not shown) controls the output frequency of oscillator 1, which outputs a square wave. The output of the oscillator 1 is split, one half being passed through an inverter 2, to create two complementary outputs in anti-phase with each other. These anti-phase outputs are connected to the inputs of two dual input AND gates 3 and 4, the other inputs of the two AND gates being connected to the output of a voltage comparator 5. The outputs of the two AND gates 3, 4 are connected to a MOS gate driver IC 6, which drives a pair of MOSFETs 9, 10 via gate drive resistors 11, 12. The MOS gate driver IC 6 is provided with means of isolation which allows the gate of the "high side" MOSFET 9 to be driven at a voltage referenced to the source connection of the MOSFET. Each MOSFET 9, 10 is provided with a series connected Schottky diode 13, 14 and an anti-parallel connected fast recovery diode 15, 16. The Schottky diodes 13, 14 prevent any flow of reactive currents in the output circuit from circulating via the inherently slow recovery body diodes in the MOSFETs 9, 10 and force reactive currents to flow instead in the fast recovery diodes 15, 16. Switching node A is connected to one terminal of inductor 17 and the other terminal is connected via node B to a capacitor 18 and to the lamp 19. The capacitor 18 is connected to node C. The lamp 19 is returned to node C via the primary winding of current transformer 20. Node C provides a current return path for capacitor 18 and lamp 19 via capacitors 21, 22 to the +HT and 0V rails.

In the first mode of operation, the frequency control circuit sets the oscillator frequency to typically several tens of kilohertz. The output of voltage comparator 5 (node F) is a logic 1 so the anti-phase complementary outputs from oscillator 1 and inverter 2 are "passed" by AND gates 3 and 4, driving the inputs of the MOS gate driver IC 6, which in turn drives the gates of the MOSFETs 9 and 10. Thus, through the alternate switching of the two MOSFETs on and off in opposition, the voltage at node A is switched alternately and substantially between the voltage of the +HT rail and the voltage of the 0V rail.

The switching frequency and the values of the inductor 17 and capacitor 18 are chosen such that the L C resonant circuit formed by these components is stimulated at the fundamental resonant frequency of the components or a harmonic thereof. Thus voltage multiplication occurs at node B owing to the Q factor of the resonant components 17 and 18. The resonant components are designed with sufficient Q factor to provide a voltage capable of ionising the gas filling the arc tube of lamp 19, thus initiating an arc at the lamp electrodes. This arc is sustained by current flowing via the primary winding of current transformer 20 and node C to the capacitors 21 and 22, which allow the current to return to the +HT and 0V rails. The arc impedance is sufficiently low to divert most of the current flowing in inductor 17 away from capacitor 18 and via the lamp 19. Should the arc extinguish for any reason it will re-establish due to voltage multiplication in the resonant circuit. Any rectification effect in the lamp 19 or variance in the duty cycle of the switching of MOSFETs 9, 10 from the ideal 50:50 duty cycle is accommodated by offsetting the voltage at node C, thus ensuring that the lamp current has no DC element and is substantially high frequency AC.

Lamp current is transformed by the turns ratio of the current sensing transformer 20, rectified by rectifier 23 and converted to a positive voltage proportional to lamp current across resistor 24. This voltage appears at node D and is referenced to the 0V rail. Node D is connected to the inverting input of voltage comparator 5. The voltage at node D is compared with a voltage set by a potential divider (resistors 25 and 26), the mid point of which (node E) is connected to the non-inverting input of voltage comparator 5. Should the lamp current proportional voltage at node D exceed the voltage set by the potential divider at node E the output (node F) of the voltage comparator 5 is switched to a logic 0 state. Since node F is connected to the inputs of the AND gates 3 and 4, both outputs from the AND gates are then forced to a logic 0 level irrespective of the logic states of the other inputs to the AND gates set by the outputs of the oscillator 1 and the inverter 2. Thus whichever MOSFET 9 or 10 was conducting and sourcing current into the lamp circuit is switched to a non-conducting state and reactive current flowing in the inductor 17 is circulated via the opposite fast recovery diode 16 or 15. When the current value decays sufficiently to reduce the lamp current proportional voltage at node D to a voltage below that set at node E, the voltage comparator output node F returns to a logic 1 state allowing the AND gates 3 and 4 to "pass" the relevant logic states set on their other inputs and thus to switch the relevant MOSFET 9, 10 to a conducting state.

A resistor 27 provides a determined level of positive feedback or "hysteresis" that ensures that the current limiting described above operates between two determined current values and that the switching due to the current limiting circuit is limited to a frequency low enough to ensure that the switching losses associated with the current limit controlled switching of the MOSFETs 9, 10 are maintained at reasonable levels. Typically, although not exclusively, the lamp current in the first mode of operation is insufficiently high to trigger operation of the current limit circuit. The circuit operates in this first mode until the lamp electrodes are sufficiently heated to establish thermionic emission. The circuit is then switched to the second of the two discrete modes of operation.

In the second mode of operation, the frequency control circuit sets the oscillator 1 to a second, lower frequency, typically though not exclusively several tens or hundreds of hertz. Since thermionic emission is already established in the lamp by the heating of the electrodes in the first mode of operation, the voltage available at the lamp terminals in this second (non-resonant) mode of operation is sufficient to maintain the arc at the lamp electrodes. The output of voltage comparator 5 (node F) is a logic 1 so the anti-phase complementary outputs from oscillator 1 and inverter 2 are "passed" by AND gates 3 and 4, driving the inputs of the MOS gate driver IC 6, which in turn drives the gates of the MOSFETs 9, 10. Thus, through the alternate switching of the two MOSFETs 9, 10 on and off in opposition, the voltage at node A is switched alternately and substantially between the voltage of the +HT rail and the voltage of the 0V rail. The lamp arc is sustained by current flowing via the primary winding of current transformer 20 and node C to the capacitors 21 and 22, which allow the current to return to the +HT and 0V rails. The arc impedance is sufficiently low to divert most of the current flowing in inductor 17 away from capacitor 18 and via the lamp 19.

The current limiting circuitry operates through current transformer 20 and voltage comparator 5 in just the same way as in the first mode of operation described above. Since the oscillator frequency in the second mode of operation is substantially lower than in the first mode of operation, the inductor 17 will pass much higher currents as its impedance at low frequency is much lower than its impedance at high frequency. Therefore the operation of the current limiting circuit described above is an essential feature in this second mode of operation. Indeed, due to the operation of the current limiting feature it may be seen that the lamp current waveform illustrated schematically in FIG. 3 approximates a square wave with a small amount of high frequency ripple, due to the operation of the current limiting circuit, superimposed on the top and bottom extremities of the waveform. Since the lamp current waveform is near square it has a current crest factor approaching 1, thus minimising thermal stress on the lamp electrodes and extending the lamp life and colour maintenance.

Figure 4:
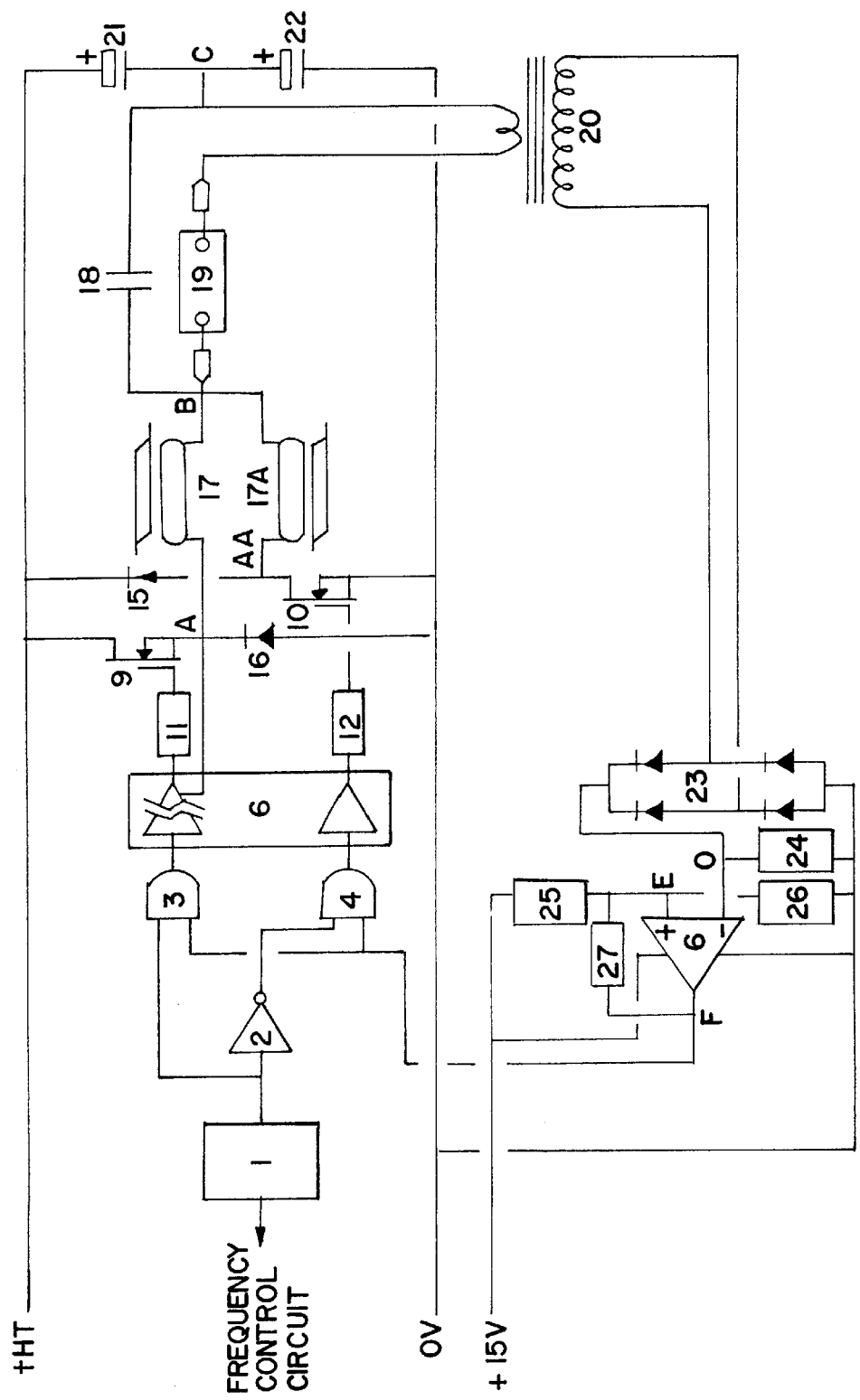
FIG. 4 illustrates a lamp ballast circuit according to a second preferred embodiment of the invention.

FIG. 4 shows a second preferred embodiment of the invention, in which the power switching elements, associated diodes and resonant component arrangement differ from that shown in FIG. 2. The Schottky diodes are no longer required as each of the MOSFETs 9, 10 is serially connected to a fast recovery diode 16, 15. The respective MOSFET to diode connection nodes A and AA are further connected to separate inductors 17 and 17A, which are connected to each other at node B, which is also connected to capacitor 18 and lamp 19. The circuit operates in two discrete modes. In the first mode, the operation of the circuit is the same as that which is described with reference to FIG. 2, except that the alternate switching of the MOSFETs 9 and 10 alternately connects node A to the +HT rail and node AA to the 0V rail so that the LC resonant circuit comprising inductors 17 and 17A and capacitor 18 is stimulated alternately via node A and inductor 17 and via node AA and inductor 17A at the fundamental resonant frequency of the resonant LC components or a harmonic thereof. Thus voltage multiplication occurs at node B owing to the Q factor of the resonant components 17, 17A and 18. Further operation of the circuit can be described as for FIG. 2.

In the second mode, the operation of the circuit is the same as that which is described with reference to FIG. 2, except that the alternate switching of the MOSFETs 9 and 10 alternately connects node A to the +HT rail and node AA to the 0V rail in response to the oscillator 1 and inverter 2 output. Thus in one half cycle of the oscillator MOSFET 9 conducts current from the +HT rail to the lamp via node A, inductor 17 and node B; and in the opposing half cycle of the oscillator MOSFET 10 conducts current from the 0V rail to the lamp via node AA, inductor 17A and node B. As with FIG. 2, conduction of either MOSFET 9, 10 can be terminated and re-established in response to the logic level of the current limit circuit output at node F. Further operation of the circuit can be described as for FIG. 2. The removal of the serial path that exists in FIG. 2 between the MOSFETs 9, 10 improves the switching performance of the circuit as the MOSFETs 9, 10 do not have to commutate capacitive currents caused by the drain-to-source capacitance of the opposing MOSFET. The operation of this embodiment in the second mode of operation may be described as that of two "Buck" converters operating in alternate half cycles to supply lamp current.

Figure 5:
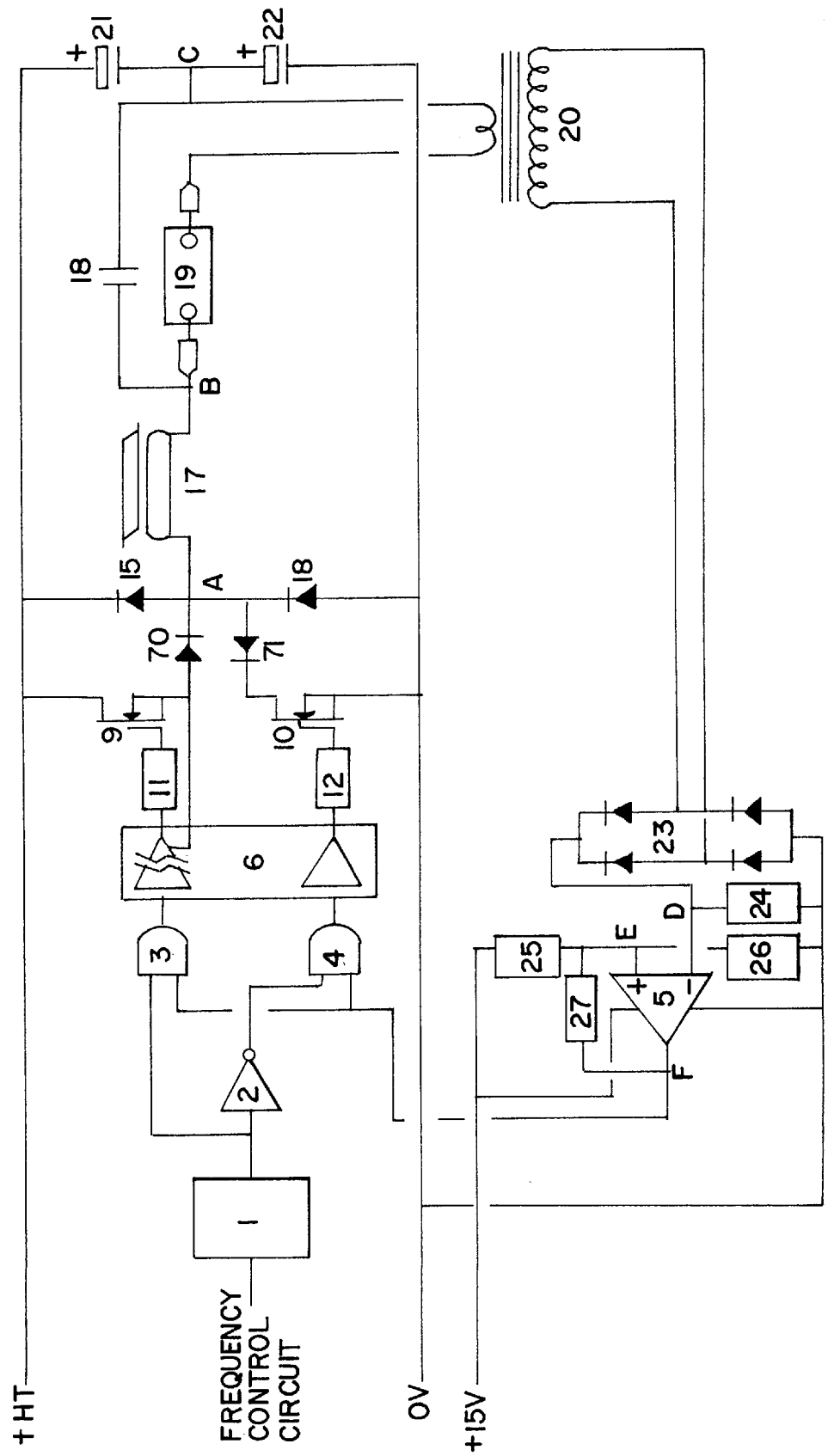
FIG. 5 illustrates a lamp ballast circuit according to a third preferred embodiment of the invention.

FIG. 5 shows a third preferred embodiment of the invention, in which the power switching elements, associated diodes and resonant component arrangement differ from that shown in FIG. 4 but are similar in arrangement to FIG. 2. The MOSFETs 9 and 10 are serially connected with diodes 70 and 71 respectively. MOSFET 9 and diode 70 are connected between the +HT rail and node A and MOSFET 10 and diode 71 are connected between the node A and the 0V rail. The polarity of the diodes 70 and 71 is arranged such that when each diode's serially connected MOSFET is in the ON condition the diode can conduct current in the same direction as the MOSFET. The diodes 70, 71 act to block the flow of current in the body diodes of the MOSFETs 9, 10. Further, the diodes 70,71 also act to block the flow of capacitive currents associated with the drain-to-source capacitance of the inactive MOSFET that would otherwise be commutated by the active (switching) MOSFET during the second of the two discrete modes of operation described with reference to FIG. 2 and FIG. 4. The operation of the circuit in the two modes of operation is otherwise the same as that described with reference to FIG. 2, with the exception of the references to Schottky diodes.

In all of the first, second and third embodiments, the capacitance of the wiring connecting the lamp 19 to the ballast may de-tune the resonant LC circuit by virtue of the capacitance of the wiring appearing in parallel to the capacitive component of the LC circuit. This may be compensated for by modulation of the frequency of the oscillator 1 during the first mode of operation. Thus long lengths of lamp wiring may be accommodated without significant degrading of the voltage multiplication of the LC circuit required for initiating the arc in the lamp 19, thus allowing lamps to be mounted some distance from the ballast.

Figure 6:
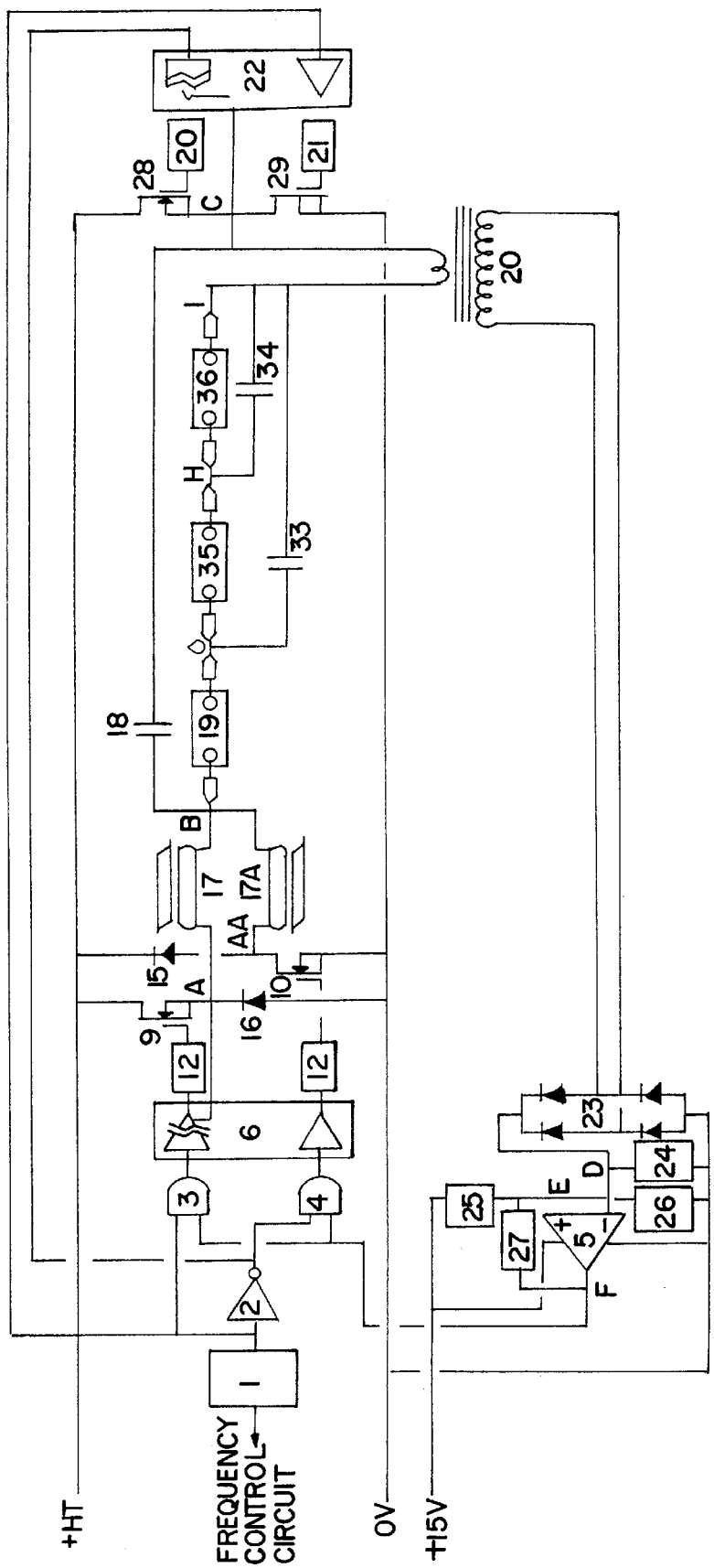
FIG. 6 illustrates a first extension of the lamp ballast circuit of the invention.

In all of the first, second and third embodiments, the function of the capacitors 21 and 22 in returning the lamp current to the rails may be replaced by two further MOSFETs operating in opposition to MOSFETs 9 and 10 but not switched under the control of the current limiting circuit. This allows higher arc voltages to be sustained which may be useful in conjunction with some HID lamp types or where a multitude of lamps 19 are connected serially between nodes B and C via a current transformer 20 or current sensing device.

Where a multitude of lamps 19 are required to operate when serially connected between nodes B and C via a current transformer 20 or current sensing device, it may not be possible to ionise the gas in the multitude of serial connected lamps 19 with the voltage available from the LC resonant circuit. FIG. 6 shows an extension applicable to any of the three embodiments, where a capacitor or capacitors 33, 34 are connected in parallel with a lamp or a multitude of lamps 35, 36. In this circuit the high voltage generated by the resonant LC components 17, 17A and 18 is initially forced to appear substantially between nodes B and G owing to the relatively low impedance of the capacitor 33 compared with lamp 19 and its associated wiring. This causes the gas in lamp 19 to ionise and the arc to initiate at the electrodes of lamp 19. Lamp 19 then appears as a low impedance, forcing the high voltage from the resonant circuit to appear across nodes G and H owing to the relatively low impedance of capacitor 34 compared with lamp 35 and its associated wiring. This causes the gas in lamp 35 to ionise and the arc to initiate at the electrodes of lamp 35. Lamp 35 then appears as a low impedance, forcing the high voltage from the resonant circuit to appear across nodes H and I and causing the gas in lamp 36 to ionise and the arc to initiate at the electrodes of lamp 36. Once the arc is initiated in all of the lamps 19,35,36 the lamp electrodes are heated by lamp current until sufficient temperature is achieved for thermionic emission to occur. The circuit is then switched to the second of the two discrete modes of operation as described with reference to FIG. 2. The bypass capacitor or capacitors 33, 34 must be significantly lower in value than the resonance capacitor 18 to avoid detuning the resonant circuit as the bypass capacitors successively come into operation.

FIG. 6 also shows the addition of two MOSFETs 28 and 29 as described earlier, which may be required to provide sufficient voltage to sustain the arc or arcs when a lamp type with a high arc voltage or a multitude of lamps are connected. These MOSFETs 28, 29 are driven by a MOS gate driver IC 32 from the complementary outputs of the oscillator 1, in opposition to MOSFETs 9 and 10 but not switched under the control of the current limiting circuit.

Figure 7:
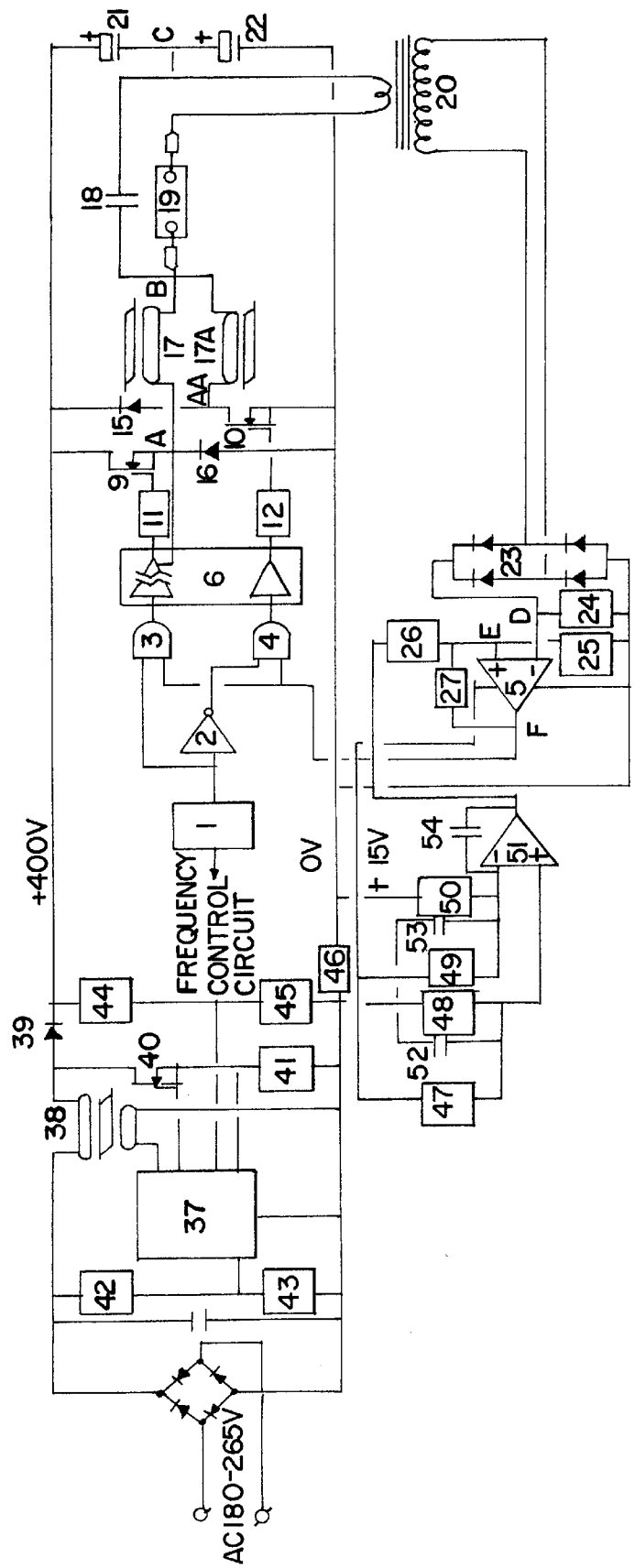
FIG. 7 illustrates a second extension of the lamp ballast circuit of the invention.

In a second extension applicable to any of the three embodiments, shown in FIG. 7, lamp power is controlled by a novel means. A power factor controller circuit comprises integrated circuit 37, inductor 38, diode 39, MOSFET 40 and current sense resistor 41. Input and output voltage sensing is provided by potential dividers comprising resistors 42, 43 and 44, 45 respectively. The operation of such power factor controller circuits is well known and need not be discussed here. Suffice it to say that the power factor controller circuit operates to maintain a constant output of 400V at the reservoir capacitors 21 and 22 over a range of input voltages and output loads.

Since the output voltage is constant it is apparent that the load power is proportional to the current flowing in the 400V output bus. An output current sensing resistor 46 is provided in series with the 0V output from the power factor controller. Potential dividers comprising resistors 47, 48 and 49, 50 are connected in the first instance between the 0V output of the PFC circuit prior to the current sense resistor and the +15V power rail and in the second instance between the 0V output of the PFC circuit subsequent to the current sense resistor and the +15V power rail. The resistor values in these potential dividers are chosen firstly such that the voltages applied to the inputs of operational amplifier 51 are within the common mode input voltage range of that amplifier and secondly such that a chosen value of output power (lamp power) will result in a differential voltage of zero at the inputs of the operational amplifier 51. Capacitors 52 and 53 are provided to decouple the high frequency ripple current generated by the PFC circuit. Capacitor 54 is connected from the output to the inverting input of the operational amplifier 51. With this connection the amplifier 51 integrates the voltage difference signal applied to the inputs.

The input difference signal of the operational amplifier 51 is proportional to output power (lamp power), the lamp 19 being driven from a current sourcing circuit as previously described. Therefore if the lamp arc voltage changes because of lamp ageing or temperature variation etc. the lamp power will change in proportion to the arc voltage. However if the lamp power deviates from the desired value chosen by the values of resistors 47, 48 and 49, 50 the differential voltage at the inputs of the integrating operational amplifier 51 will cause the output voltage of the amplifier to change. The output of the integrating amplifier is connected to the top of the potential divider comprising serially connected resistors 25 and 26. The junction of the resistors 25 and 26 is further connected to the input of the voltage comparator 5 at node E. Since the voltage at node E is the reference value for the lamp current control circuit previously described any change in voltage at node E will result in a change in lamp current. Thus any change in lamp arc voltage results in a change in voltage at the output of the integrating amplifier 51, which changes the reference value at node E for the comparator 5 and results in a change in lamp current sufficient to return the lamp power to the desired value.

Figure 8:
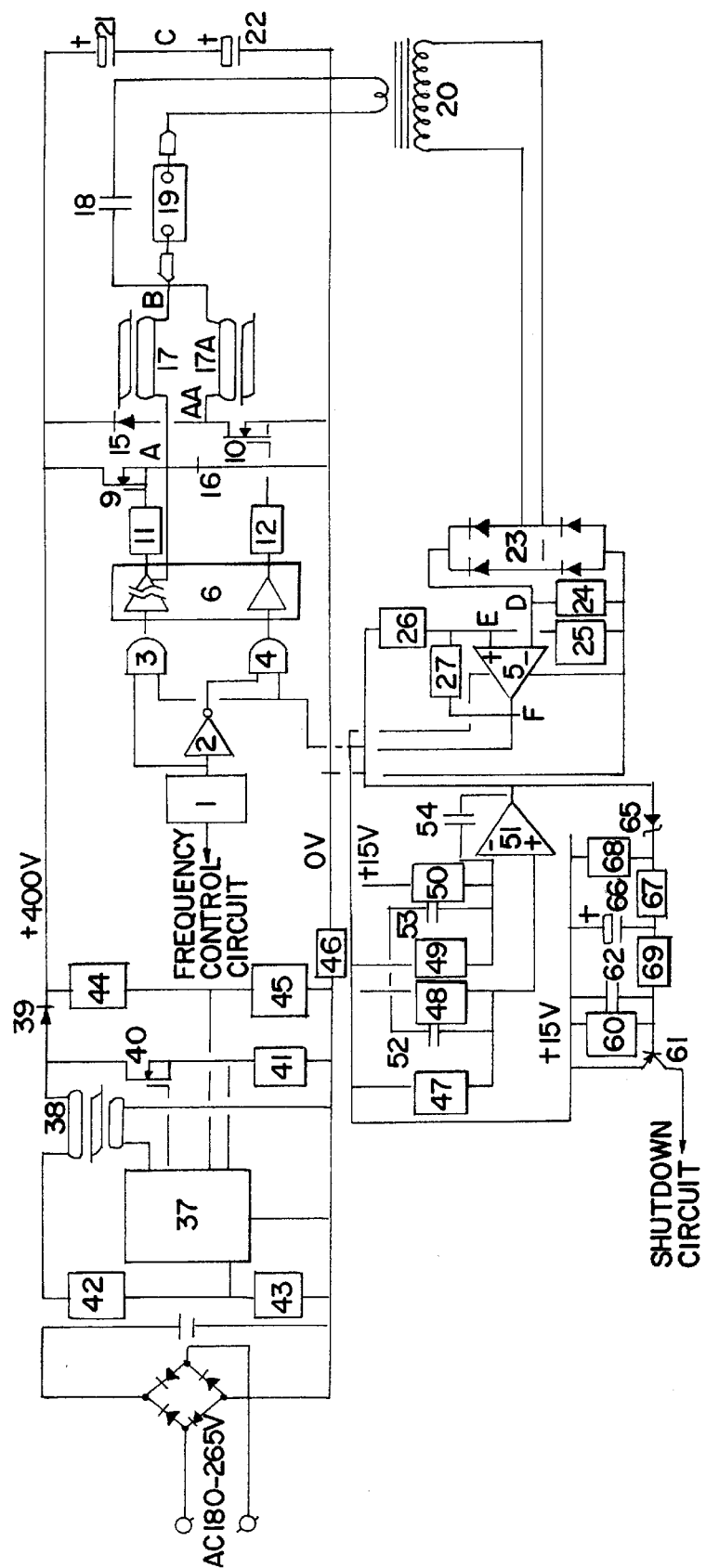
FIG. 8 illustrates a third extension of the lamp ballast circuit of the invention.

A third extension applicable to any of the three embodiments utilising the second extension is shown in FIG. 8. A novel means of detecting an aged or faulty lamp is made possible by virtue of the output voltage from the integrating amplifier 51 being inversely proportional to the lamp arc voltage at a chosen lamp power. The anode of a Zener diode 55 is connected to the output of integrating amplifier 51. The cathode of the zener diode 55 is connected to resistor 56 which ensures that the current in the zener diode 55 is sufficient to provide good zenering characteristics. Resistor 57 is also connected to the cathode of the zener diode 55 and is serially connected to capacitor 58. Resistor 57 and capacitor 58 provide an R C time constant so as to ensure the circuit ignores momentary changes in lamp voltage as can occur during warm-up. A potential divider comprising serially connected resistors 59 and 60 divides the voltage at the junction of resistor 57 and capacitor 58. The junction of resistors 59 and 60 is further connected to the base of a transistor 61 and to a capacitor 62 which provides high frequency noise rejection. If the negative voltage (with reference to the +15V rail) on the anode of zener diode 55 exceeds the zenering voltage, capacitor 58 charges negative with reference to the +15V rail until the potential divider is able to source enough current into the base of transistor 61 to turn on the transistor. The collector of the transistor is connected to a shutdown circuit which turns off the current to the lamp 19 in response to the excessive lamp arc voltage.

What is claimed is:

1. A high intensity discharge lamp ballast circuit comprising:
   first and second high intensity discharge lamp terminals operable to connect with a lamp;
   a resonant circuit to which the first lamp terminal is connected;
   first switching means operable to connect the resonant circuit to a higher voltage rail of a source of high voltage;
   second switching means operable to connect the resonant circuit to a lower voltage rail of the source of high voltage;
   a first control operable to alternately select the first and second switching means to alternately supply current to the resonant circuit; and
   a second control operable to disable the switch which is selected by the first control.

2. A lamp ballast circuit according to claim 1, wherein:
   the first and second switching means are connected in series between the higher voltage rail and the lower voltage rail; and
   the resonant circuit comprises a capacitor connected in parallel with the lamp, and an inductor connected in series between the first lamp terminal and a node at the junction of the first and second switching means.

3. A lamp ballast circuit according to claim 2, further comprising:
   a first Schottky diode connected in series with the first switching means between the higher voltage rail and the node;
   a first fast recovery diode connected between the node and the higher voltage rail, in antiparallel with the first switching means and the first Schottky diode;
   a second Schottky diode connected in series with the second switching means between the lower voltage rail and the node; and
   a second fast recovery diode connected between the node and the lower voltage rail, in antiparallel with the second switching means and the second Schottky diode.

4. A lamp ballast circuit according to claim 2, further comprising:
   a first diode connected in series between the first switching means and the node;
   a first fast recovery diode connected between the node and the higher voltage rail, in antiparallel with the first switching means and the first diode;
   a second diode connected in series between the node and the second switching means; and
   a second fast recovery diode connected between the node and the lower voltage rail, in antiparallel with the second switching means and the second diode.

5. A lamp ballast circuit according to claim 1, wherein:
   the first switching means is connected between the higher voltage rail and a first node, and a first diode is connected between the first node and the lower voltage rail; and
   a second diode is connected between the higher voltage rail and a second node, and the second switching means is connected between the second node and the lower voltage rail;
   and wherein the resonant circuit comprises:
     a capacitor connected in parallel with the lamp;
     a first inductor connected between the first lamp terminal and the first node; and
     a second inductor connected between the first lamp terminal and the second node.

6. A lamp ballast circuit according to claim 1, wherein:
   a first return capacitor is connected between the second lamp terminal and the higher voltage rail; and
   a second return capacitor is connected between the second lamp terminal and the lower voltage rail.

7. A lamp ballast circuit according to claim 1, wherein:
   a third switching means is connected between the second lamp terminal and the higher voltage rail, the third switching means being operated by the first control in phase with the second switching means and independently of the second control; and
   a fourth switching means is connected between the second lamp terminal and the lower voltage rail, the fourth switching means being operated by the first control in phase with the first switching means and independently of the second control.

8. A lamp ballast circuit according to claim 1, further comprising: a number n of further lamps connected in series with the lamp; and the same number n of bypass capacitors, wherein the kth bypass capacitor, from k=1 to k=n, is connected in parallel with the first k further lamps of the series.

9. A lamp ballast circuit according to claim 1, wherein the second control comprises:
   sensing means for measuring the current through the lamp;
   means for representing the measured current as a voltage signal;
   means for comparing the voltage signal with a reference voltage; and
   means for disabling the operation of the first and second switching means if the compared voltage signal is greater than the reference voltage.

10. A lamp ballast circuit according to claim 9, further including a lamp power control means, comprising:
    a power factor controller for receiving input from an external power source and for supplying a stable voltage to the higher and lower voltage rails;
    means for sensing the value of the current flowing in the higher and lower voltage rails; and means for changing the reference voltage in response to deviations from a set value of the current flowing in the higher and lower voltage rails.

11. A lamp ballast circuit according to claim 10, further comprising shutdown means for turning off current to the lamp if the reference voltage passes a predetermined threshold.

12. The circuit of claim 1 wherein the second control is operable to turn-on and turn-off the selected switching means a plurality of times.

13. The circuit of claim 12 wherein the first and second switching means are operable to generate a lower frequency waveform with a higher frequency ripple in response to the first and second controls.

14. The circuit of claim 12 wherein the one switching means is operable to generate a ripple waveform in response to the second control.

15. The circuit of claim 1 wherein the second control comprises a current limiter.

16. The circuit of claim 1 wherein the first control comprises an oscillator.

17. The circuit of claim 1 wherein the first control is operable in first and second discrete modes, the first mode characterised by a higher frequency output than the second mode.

18. The circuit of claim 17 wherein the first mode corresponds to initiating current in the lamp in the absence of thermionic emission and the first control is operable to output a modulated frequency waveform during the first mode.

19. The circuit of claim 1 wherein the second control is responsive to a current through the lamp and the current through the lamp is responsive to first and second capacitors connected with the second lamp terminal.

20. A method of powering a lamp via a lamp ballast circuit, the method comprising the steps of:
(a) providing a lower frequency turning on and off signal for first and second switches
(b) providing a higher frequency turning on and off signal for the first and second switches;
(c) repeatedly tuning off and on the first and second switches in response to the lower and higher frequency signals wherein the response is a function of AND logic; and
(d) operating a high intensity discharge lamp in response to (c).

21. A method according to claim 20, further comprising:
(e) operating in first and second modes characterised by different lower frequencies, the first mode further characterised by performing (a) in the absence of (b); and
(f) modulating the lower frequency.

22. A method according to claim 20, wherein (b) comprises:
measuring a current through the lamp;
representing the measured current as a voltage signal;
comparing the voltage signal with a first reference voltage; and
inhibiting the operation of the first and second switches if the voltage signal is greater than the first reference voltage.

23. A method according to claim 21, wherein a first lower frequency is greater than 20 kHz and a second lower frequency is less than 1 kHz.

24. A method according to claim 20 further comprising:
(e) generating through the lamp a low frequency waveform containing a high frequency ripple.

25. The method of claim 20 wherein (b) is responsive to a current through the lamp.

26. The method of claim 25 wherein the current through the lamp is responsive to a voltage between two serially connected capacitors connected with the lamp.

27. A high intensity discharge lamp ballast circuit comprising:
first and second high intensity discharge lamp terminals operable to contact a lamp;
a resonant circuit connected with the first lamp terminal;
a first switch connected with the resonant circuit and a higher voltage rail;
a second switch connected with the resonant circuit and a lower voltage rail;
an oscillator connected with the first and second switches; and
a comparator connected with the first and second switches;
wherein the first and second switch are alternatively turned on in response to the oscillator and while turned on in response to the oscillator are operable to be turned off in response to the comparator.

28. The circuit of claim 27 further comprising:
an inverter connected with the oscillator and the second switch;
a first AND gate connected with the oscillator, the comparator and the first switch; and
a second AND gate connected with the inverter, the comparator and the second switch.

29. The circuit of claim 27 wherein the comparator is operable to compare a reference voltage to a voltage representing a current through the lamp.

30. The circuit of claim 29 wherein the first and second switches are operable to generate a higher frequency ripple current at the lamp in response to the comparator with a lower frequency waveform at the lamp in response to the oscillator.

31. The circuit of claim 27 wherein the comparator is responsive to a current through the lamp and the current through the lamp is responsive to a voltage between two serially connected capacitors connected with the second lamp terminal.

32. The circuit of claim 27 wherein the oscillator is operable to generate first and second different frequency waveforms in first and second modes of operation, respectively.

33. The circuit of claim 32 wherein the first mode corresponds to initiating current in the lamp in the absence of thermionic emission and the oscillator is operable to output a modulated frequency waveform during the first mode.

34. A method of powering a high intensity discharge lamp with a lamp ballast circuit, the method comprising the steps of:
(a) generating a lower frequency waveform containing a higher frequency ripple; and
(b) operating the high intensity discharge lamp in response to the lower frequency waveform with the higher frequency ripple.

35. The method of claim 34 further comprising:
(c) operating the lamp ballast circuit in first and second modes, the first mode characterized by another waveform with a higher frequency than the lower frequency waveform and characterized by the absence of the higher frequency ripple, the second mode characterized by (a) and (b).

36. The method of claim 34 wherein (a) comprises:
(a1) generating the lower frequency waveform with two switches in response to an oscillator; and
(a2) generating the higher frequency ripple with the two switches in response to a current through the lamp.

37. A high intensity discharge lamp ballast circuit comprising:
an oscillator operable to generate a modulated frequency waveform;
first and second switches responsive to the modulated frequency waveform;
a resonant circuit connected with the first and second switches; and
a high intensity discharge lamp connected with the resonant circuit;
wherein the oscillator is operable in first and second modes, the first mode characterized by the modulated frequency waveform and the second mode characterized by a waveform with a frequency lower than the first mode, wherein the first and second switches are operable to generate a low frequency waveform with a higher frequency ripple in the second mode.

38. The circuit of claim 37 further comprising a current limiter responsive to a current through the lamp, wherein the first and second switches are responsive to the current limiter.

* * * * *